United States Patent [19]

Lanzilloti

[11] 4,213,701

[45] Jul. 22, 1980

[54] LENS TESTING APPARATUS AND METHOD

[76] Inventor: J. J. Lanzilloti, 1730 La Granada Dr., Thousand Oaks, Calif. 91360

[21] Appl. No.: 956,465

[22] Filed: Oct. 30, 1978

[51] Int. Cl.² .............................................. G01B 9/00
[52] U.S. Cl. ..................................... 356/124; 356/125
[58] Field of Search ...................... 356/124, 124.5, 125, 356/153

[56] References Cited

PUBLICATIONS

Smith, Warren J., *Modern Optical Engineering*, McGraw-Hill, N.Y., 1966, pp. 434, 435.
Hume, K. J., *Metrology with Autocollimators*, Hilger & Watts Ltd., London, 1965, pp. 6–10.

*Primary Examiner*—John K. Corbin
*Assistant Examiner*—Bruce Y. Arnold
*Attorney, Agent, or Firm*—Jessup & Beecher

[57] ABSTRACT

An apparatus and method for measuring the dioptric power, resolving power, and astigmatic power of small lenses, and particularly for testing the acceptability of surgically implantable intraocular lenses. The apparatus is comprised of an optical system which images a reticle at its focus. The optical system includes a light source which is condensed on a test reticle which in turn is focused on a reference surface from which the measurements are made. A lens to be tested is positioned with its posterior surface coincident with the plane on which the reticle is focused. A conjugate viewing system is provided at 90° to the imaging system for viewing the image of the reticle focused on this plane. Adjusting means are provided for positioning the reticle image to coincide with the second focal plane of the lens being tested. The reticle image in this plane is converted to a colored image to distinguish it from the first focused image at the reference surface. A measuring instrument connected to the adjustment system measures the distance of the movement in adjusting the image of the reticle from the reference surface to a digital read-out. By provision of a suitable pattern on the test reticle, and a method of mechanically rotating this reticle through 180°, the image in the focal plane of the lens to be tested is used to simultaneously test the quantitative measures of the optical parameters which include dioptric power, resolving power and astigmatic power.

25 Claims, 4 Drawing Figures

LENS TESTING APPARATUS AND METHOD

BACKGROUND OF THE INVENTION

This invention relates generally to lens testing and measuring systems and devices and more particularly relates to an apparatus for testing surgically implantable intraocular lenses.

At present, the methods and apparatus for testing vision-improving lenses, such as contact lenses and surgically implantable intraocular lenses, is by measurement of the concavity or convexity of the lens and by calculation determine its dioptric power. Separate testing measures may then be used, such as focusing an image to determine resolving power and astigmatism. The present methods in existence for testing lenses are therefore necessarily complicated, as well as inaccurate. Performing separate tests for each characteristic can also be quite expensive and time consuming in order to provide extremely accurate measurements. Therefore, it would be extremely advantageous if all three measurements could be made simultaneously in one simple operation which not only provides these tests but also provides an extremely accurate measurement of these values.

SUMMARY OF THE INVENTION

The purpose of the present invention is to provide quantitative test and simultaneous measurement of the dioptric power, resolving power and astigmatism present in lenses and particularly intraocular lenses for surgical implantation in the human eye.

The present invention provides an optical system for focusing a test reticle at the focus of the instrument. Incorporated into the optical system is a viewing means perpendicular to the system for focusing the test reticle through which the focused test reticle can be viewed by means of a beam splitter and an ocular lens. The viewing and imaging systems are conjugate. A lens to be tested may then be suitably supported or positioned such that the focus of the optical system and the posterior surface of the lens are coincident. Adjustment means are provided for adjusting the reticle image so that the focused reticle on the posterior surface of the lens to be tested can be viewed. The reticle image is then focused at the second focal plane of the lens being tested through an objective lens and the focused reticle image again viewed through the viewing tube of the optical system. In this case, the focused reticle image will appear as a green image because a green filter is positioned behind the test lens and adjacent to a plane mirror to reflect back through the lens being tested into its second focal plane, and through the beam splitter in the optical system a green image of the focused reticle is observed. By this means the viewer can determine that the reticle image is at the second focal plane.

By appropriate and accurate measurement of the change in position of the reticle image from the reference surface at the posterior surface of the lens to the second focal plane, when the reticle image appears as a green image, the dioptric power, resolving power and astigmatism of the lens can be determined.

The dioptric power is determined by an arm, simultaneously movable with adjustment of the reticle image, which mechanically rotates a wheel in a mechanical meter providing a rotational movement corresponding to the linear movement of the reticle image. This in turn provides an electrical output to an analog to digital converter providing an accurate digital readout of the amount of movement of the reticle image.

Resolving power and astigmatism can be measured because the pattern applied to the test reticle has a circle pattern and a series of lined pairs and spaces perpendicular to each other in vertical and horizontal axes. A unique function of the optical system is its ability to produce unit magnification of this spacial pattern of the test reticle regardless of the dioptric power of the lens being tested. Therefore, no calculations are required to determine resolving power.

Likewise, the pattern on the test reticle, which includes lines and spaces in both the vertical and horizontal axes, perpendicular to each other respectively, can be utilized to test the ability of the lens to resolve these line pairs on both axes as an indication that the lens is free of astigmatism. If the lens is able to resolve the pattern in only one axis, then the lens has an astigmatism which can be measured by determining the difference in the dioptric power between vertical axis and the horizontal axis. A means is provided to rotate the reticle to facilitate this.

It is one object of the present invention to provide a system and method for measuring lenses which can simultaneously measure dioptric power, resolving power and astigmatism.

Yet another object of the present invention is to provide a system and method for measuring lenses which can accurately test intraocular lenses for surgical implantation.

Yet another object of the present invention is to provide a system and method for measuring lenses which can automatically measure the dioptric power.

Still another object of the present invention is to provide a system and apparatus for measuring lenses in which the optical system can be moved to vary the position of the reticle image while the lens to be tested is held stationary.

Yet another object of the present invention is to provide a system and method for testing lenses which can clearly indicate reticle images at a reference plane, and a second focal plane by converting one of the images to a colored image.

Other objects, advantages and novel features of the invention will become apparent from the following detailed description of the invention when considered in conjunction with the accompanying drawings wherein like references identify like parts throughout.

DETAILED DESCRIPTION OF THE PREFERRED EMBODIMENT

Figure 1:
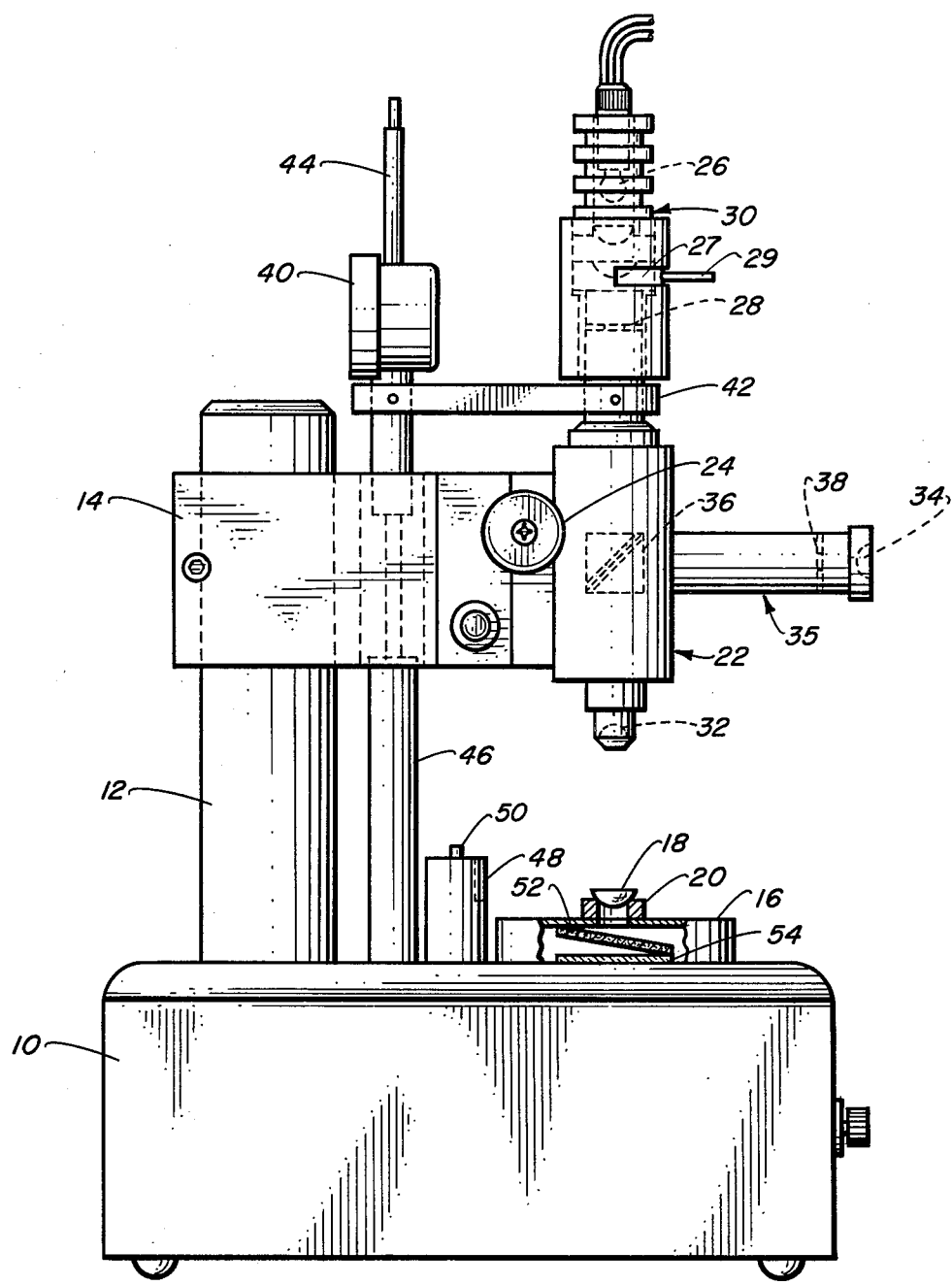
FIG. 1 is a side elevation of an apparatus for practicing the principles of testing lenses of the present invention.

The lens testing system and its principles are mainly embodied in the optical system which may obviously be mounted or packaged in any suitable manner which will provide the functions of the invention. FIG. 1 illustrates one such mechanical packaging of the optical system for testing lenses. In this figure the mechanical arrangement includes a base 10 which would house any electrical power systems, such as a power supply and controls necessary for the operation of the system and in particular controls for varying the intensity of the light source. A suitable support 16 is mounted on the base 10 to hold a lens to be tested which may be in a sterile package having optically clear windows. An open lens 18 is shown for illustration purposes only.

An optical system for focusing a test reticle on the lens 18 is movably secured to the support 14. The optical system 22 is adjusted through a focusing slide control wheel 24. This optical system 22 is comprised of a lamp 26 providing a light source which is concentrated on the test reticle 28 by a condensing lens system 30. The test reticle image is focused through an objective lens 32 positioned at the opposite end of the optical system 22. Observation of the test reticle image is provided through an eyepiece 34 containing an ocular lens for viewing the reticle image reflected by a beam splitter 36 positioned for suitably focusing the test reticle image in the focal plane 38 of the eyepiece 34.

In order to measure movements or adjustments of the optical system 22 by means of movement of the focusing slide control 24, a position indicating meter 40 attached to the optical system 22 by means of arm 42 is provided. The position indicator 40 has a plunger 44 which is stationary with respect to the optical system 22. That is, the plunger 44 is seated and resting on the support rod 46 attached to the base 10. As movable plunger 44 moves it provides a mechanical position indication on the meter 40. This meter can be any type of mechanical position indicator such as a Vernier scale or, as is preferable, a digital dial indicator which connects to a digital converter 48 for direct digital readout. The uniqueness of the lens testing system disclosed herein is not dependent upon the position indicator 40 as there are numerous methods for measuring position changes which will be apparent to those skilled in the art to which the invention pertains. The digital indicator or converter 48 has a zero reset button 50 for zeroing the system before testing begins. Such a digital dial indicator with digital readout is readily available and one such system can be procured from IKL Incorporated of Newport Beach, California. This system provides an output by movement of arm or plunger 42 rotating a gear which in turn rotates a glass disc having opaque and transparent areas. Light pulses passing through the transparent areas of the disc are counted as the disc rotates, are amplified and converted to a digital readout to indicate accurate linear movement of the rod or plunger 44. Thus, the digital readout will display millimeters of movement to a great degree of accuracy. The digital dial meter can produce accuracies as small as 1/100 of a millimeter per 25 millimeters. This readout can be converted to dioptric power for diopters of lenses being tested by appropriate automatic calculations, if desired.

Positioned beneath the lens 18 is a filter 52 preferably in the green wave length of 546 NM (nanometers) through which the light from source 26 passes to a plane mirror 54 for reflection back into the second focal plane, to the viewing system or eyepiece 34. The focusing slide control 24 can be provided with both coarse and fine focusing mechanism as is well known in the art for greater sensitivity in locating and sharpening the reticle image in the image planes. The mechanical details are known to those skilled in this art; therefore, no greater detail of this particular feature is provided. Appropriate mounting of optical elements and other components is also well within the skill of those knowledgable in this field.

As shown, the viewing system 35 should be at right angles to the imaging system of optical system 22 and although the optical system is adjustable, the system could be equally as accurate if the base 10 or lens support 16 were movable in some fashion. In this case the plunger 44 would then be adapted to move with the lens 18 while the mechanical position indicator 40 would remain stationary with the optical system 22. Also, the viewing system 35 could be vertical and the imaging system or optical system 22 horizontal, if desired, or at other convenient viewing angles (e.g. 45°, 60°, etc.) The mechanical details are not critical to the operation or functioning of the optical system if the principles described hereinafter are maintained and utilized.

Figure 2:
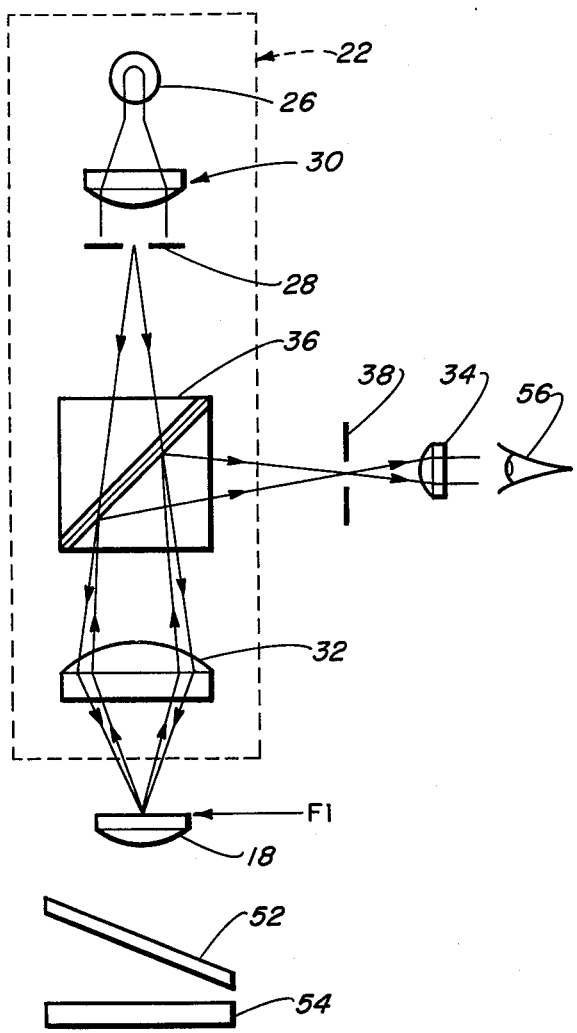
FIG. 2 is a semi-schematic diagram illustrating the first position of the optical arrangement of the lens testing system.
Figure 3:
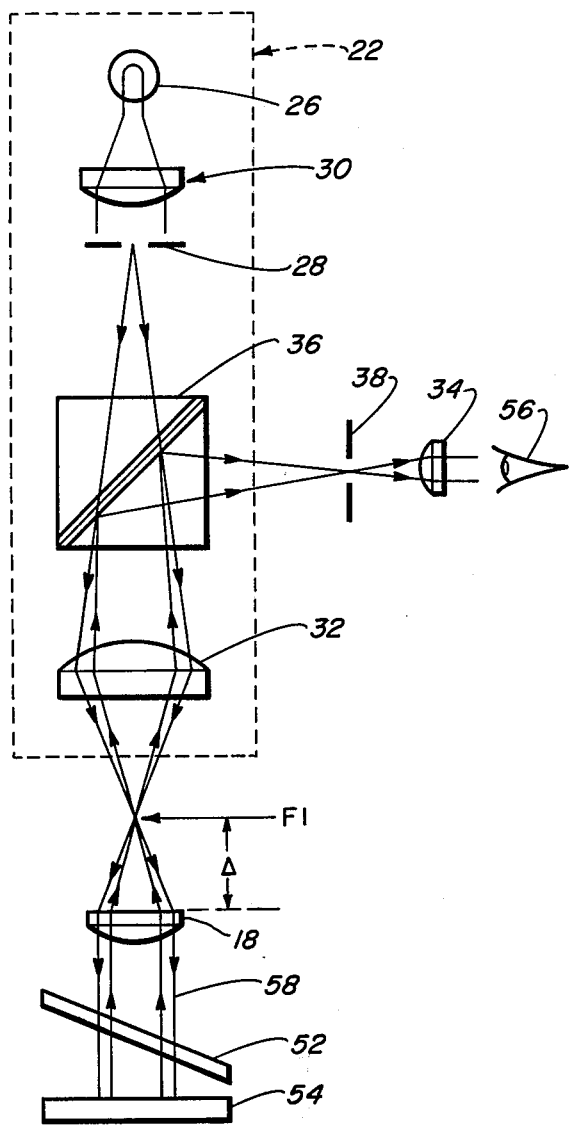
FIG. 3 is a semi-schematic diagram of the lens testing system showing the second position of the optical arrangement for testing a lens.
Figure 4:
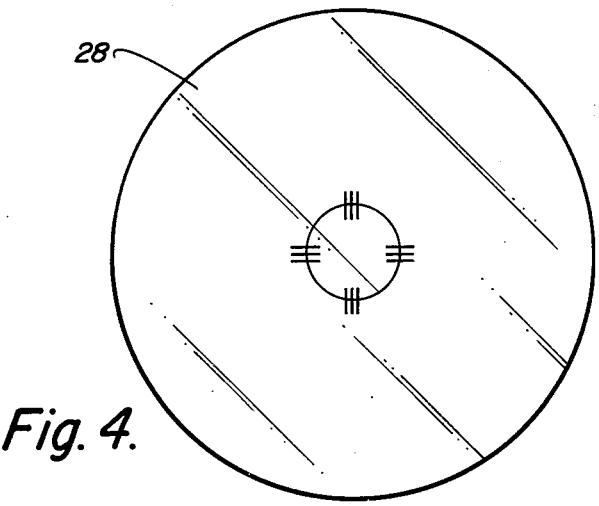
FIG. 4 is a drawing of a test reticle suitable for use in the lens testing system.

In FIGS. 2 and 3, the optical arrangement in first and second positions for testing of a lens 18 are shown. The focusing slide wheel or control 24 (FIG. 1) is adjusted to position the image of the reticle produced by light source 26 (FIG. 2) on the posterior surface of the lens 18 indicated as F1. This focused image is seen by the viewer indicated at 56 through the eyepiece or ocular lens 34 reflected by the beam splitter 36. At this point, the digital readout meter 48 (FIG. 1) is zeroed by means of switch 50. The optical system 22 is then moved away from the test lens 18, to a position illustrated in FIG. 3 with the image of reticle 28 now being focused at the second focal plane indicated at F2. The optical system 22 has now moved a distance indicated in FIG. 3 as Δ which is the distance between the posterior surface of test lens 18 to the position F1. The determination that the image of the reticle 28 is at F2 is made by the viewer 56 by observation of a green image of the focused reticle produced by the filter 52 and plane mirror 54 being reflected back through the optical system 22 off the beam splitter 36. The distance Δ read off the digital dial indicator 48 (FIG. 1) provides a measure of the dioptric power of the test lens 18.

Thus, the operation of the system to determine dioptric power is as follows: The lamp 26 and condenser lens 30 transilluminate the test reticle 28 which is imaged at the focus of objective lens 32. The viewer 35 is positioned so that the ocular lens focal plane 38 is conjugate with the test reticle 28. When the optical arrangement produces a reticle image which is focused on the posterior surface of lens 18 being tested, the image of the test reticle and posterior lens surface can simultaneously be seen by the observer 56 in the focal plane 38. This is the initial set up or first position of the optical system as illustrated in FIG. 2. The position indicator is set to zero at this point.

The operator or observer now repositions the optical system 22 so that a green colored image of the test reticle 28 is observed. This is accomplished by moving the optical system 22 vertically upward by means of the focusing slide control wheel 24 (FIG. 1). When the optical system is adjusted to this position, the observer now visualizes the second focal plane of the lens 18 being tested. Since an image of the test reticle 28 is always present at the focus of objective lens 32, and this image is now in the second focal plane of the lens being tested, the lens now produces an image of the test reticle at infinity (represented by the parallel beam indicated at 58), emerging from the test lens 18.

This parallel beam 58 then passes through green filter 52 and is reflected by plane mirror 54 and reimaged by the test lens 18 at a second focal plane F1. Since this spatial position will correspond with the focus of objective lens 32, the reticle image at this second position will be seen by the observer indicated at 56. This reticle image will now appear green in color because it has passed through the filter 52, which has a peak transmission of 546 NM (nanometers), very near the maximum sensitivity of the human eye. This particular wave length is particularly significant because the principal purpose of the invention is for testing intraocular lenses suitable for surgical implantation in the human eye. Obviously, other colors may be used to change the image indicating the second focal plane, but the particular filter having a range near the maximum sensitivity of the human eye, and particularly in the range 540 to 560 NM is desired. The filter 52 is placed at an angle to the axis of the optic system and preferably at right angles to prevent reflections from its surfaces from entering the optical system.

The distance Δ is equal to the back focal length of the lens 18 being tested and is translated to dioptric power and displayed on the digital readout meter 48. The digital readout is activated by mechanical position indicator 40 which includes an optical encoder (not shown) and electrical circuit mounted in base 10, as required to translate the motion of plunger 44 into numerical terms relating to dioptric power in the eye according to the equation:

$$\frac{1}{s} + \frac{n''}{s''} = \frac{n'-1}{|r_1|} + \frac{n''-n'}{|r_2|}$$

Where:
S″ = the distance delta in millimeters
n″ = refractive index of the eye (vitreous humour)
$|r_1|$ and $|r_2|$ = the radius of the curvature of the lens
s = infinity (parallel beam)
n′ = index of refraction of the lens material When the optical system is initially focused as shown in FIG. 2, the switch 54 is depressed causing the digital readout to return to its zero or starting position. When the optical system is refocused as shown in FIG. 3, the digital readout will display dioptric power of the lens being tested. The dioptric power can be in millimeters of movement which can be easily converted by appropriate automatic calculations to diopters.

Another unique feature of the system for testing lenses is that the optical system produces unit magnification of the reticle spatial pattern regardless of the dioptric power of the lens. Thus, the apparatus and system can be used to determine resolving power of a lens without any calculations. Resolving power is determined by studying the resolution characteristics when the lens is focused as shown in FIG. 3 (and hence the dioptric power indicated and displayed). For this purpose the test reticle blank has a series of lines and spaces in both vertical and horizontal axes in addition to the circular pattern blank which is imaged here. The spatial frequency of the vertical and horizontal lines and spaces corresponds with the resolution capability of the lens being tested and represents 100 line pairs per millimeter (LP/MM) in the image plane. The resolution capability of 100 LP/MM has been selected because it is the criteria of resolution required for surgically implantable lenses.

The system and apparatus disclosed herein also has the unique ability of determining the degree of astigmatism of the lens being tested. This occurs because the pattern of the test reticle plane includes lines and spaces in both the vertical and horizontal axes, and the ability of the lens being tested to resolve these line pairs on both axes indicates that the lens is free of astigmatism. Means are provided to rotate the test reticle 28 in order to quantitatively determine astigmatism. This is in the form of a lever 29 on rotatable housing 27 in which the test reticle 28 is mounted. The reticle may be rotated to determine minimum and maximum resolution which defines the axis of astigmatism. If the lens being tested is able to resolve the perpendicular lines of the reticle pattern one axis at a time only, (either the horizontal or vertical lines of the reticle pattern) the lens is, by definition, astigmatic. The digital dial indicator can then be utilized to determine the difference in dioptric power between the planes of focus of the vertical lines and the horizontal lines. The difference in the dioptric power between the vertical axis and the horizontal axis is the astigmatic power.

Thus, there has been disclosed a system and apparatus for testing lenses and particularly surgically implantable intraocular lenses which has a number of unique features and advantages. These are that the system allows simultaneous measurements of dioptric power, resolving power and astigmatic power. Further, these tests are performed at a wave length (546 NM) corresponding to maximum visual sensitivity of the human eye. This is important because this system is designed particularly for testing lenses which are to be surgically implanted in the human eye. Another significant advantage of this invention is that it can allow intraocular lenses to be tested in the sterile package which the lenses are supplied in, if the package utilizes optically clear windows. Further, because the optical system design produces unit magnification of the test reticle image, resolving power, (LP/MM) can be measured directly and need not be calculated as a function of dioptric power of the lens being tested. The ease of use and accuracy of the system is also significant because the spatial position of the lens being tested is not critical as reference is made to the posterior lens surface optically, not mechanically, and this position is the zero point of the digital dial readout for determining dioptric power. By tilting the green filter at an angle, preferably at or less than a 45° angle to the parallel plane, surface reflections are eliminated.

Finally, coarse and fine focusing mechanisms for greater sensitivity and accuracy in locating the image planes are preferably included.

Obviously, many modifications and variations of the present invention described hereinabove and in the following claims may be made without departing from the details of the invention described herein.

What is claimed is:
1. A system for testing lenses comprising:
means for forming a first image of a reticle at an image plane location;
means for positioning a reference surface of a test lens at said image plane location;
a mirror located on the side of said test lens opposite said image plane location;
means for adjusting the distance between said image plane location and said reference surface so that a second image of the reticle is formed by light which passes through said test lens, is reflected by said mirror, and which passes back through said test lens;

means for viewing said first and second images;

means for rendering the spectral characteristic of said second image distinguishable from that of said first image;

means for measuring the distance between said image plane location and said reference surface when said second image of the reticle is formed, whereby characteristics of said lens to be tested may be determined.

2. The system as in claim 1 wherein said means for forming a first image is an optical system comprising:
   a light source;
   a condensing lens for concentrating said light source;
   a reticle having a circle intersected by mutually perpendicular sets of lines; and,
   an objective lens for focusing the image of said reticle.

3. The system as in claim 2 wherein said adjusting means comprises means for moving said optical system.

4. The system as in claim 2 wherein said viewing means is incorporated into said optical system and comprises:
   a beam splitter between said reticle and said objective lens; and
   an ocular lens for viewing the image reflected from said beam splitter.

5. The system as in claim 4 wherein said means for forming a first image is in line with the lens to be tested and the viewing means is perpendicular to the imaging means.

6. The system as in claim 1 wherein the reference surface of the lens being tested is the posterior surface of an intraocular lens.

7. The system as in claim 1 wherein the means for distinguishing the first and said second images of the reticle at the reference surface and second focal plane comprises;
   a colored filter for receiving light passing through said lens to be tested;
   a plane mirror behind said colored filter for reflecting the infinity focused image into the second focal plane, then to the viewing means.

8. The system as in claim 7 wherein said colored filter transmits light in the wavelength approximately corresponding to the maximum visual sensitivity of the human eye.

9. The system as in claim 8 wherein the filter is a green filter and transmits light in the range of 540 to 560 namometers.

10. The system as in claim 9 wherein said filter is approximately 546 nanometers.

11. The system as in claim 1 wherein said measuring means comprises:
    mechanical means for mechanically indicating the movement of said adjustment means; and
    converting means for converting the mechanical indication to a digital readout.

12. The system as in claim 11 wherein said mechanical means comprises:
    an arm movable with said imaging means; and
    indicating means for indicating the amount of movement of said arm.

13. The system as in claim 1 wherein said measuring means comprises:
    an extendable arm attached to and movable with said optical system;
    indicating means for indicating the amount of movement of said arm; and
    digital conversion means for converting the output from said indicating means to a direct digital readout.

14. The system as in claim 1 wherein said adjustment means is adapted to move said imaging means while said positioning means for said test lens is stationary.

15. The system as in claim 1 wherein said adjustment means is adapted to move the positioning means for the lens to be tested while the imaging means remains stationary.

16. A method of testing lenses for dioptric power comprising:
    forming a first image of a reticle at an image plane location;
    positioning a reference surface of a test lens at said image plane location;
    locating a mirror on the side of said test lens opposite said image plane location;
    adjusting the distance between said image plane location and said reference surface so that a second image of the reticle is formed by light which passes through said test lens, is reflected by said mirror, and which passes back through said test lens;
    viewing said first and second images;
    rendering the spectral characteristics of said second image distinguishable from that of said first image;
    measuring the distance between said image plane location and said reference surface when said second image of the reticle is formed;
    whereby dioptric power of said lens being tested may be determined.

17. The method according to claim 16 wherein the adjusting step comprises:
    adjusting the position of the lens to be tested while maintaining the reticle image stationary.

18. The method according to claim 16 wherein the adjusting step comprises:
    adjusting the position of the reticle image while the lens to be tested is held stationary.

19. The method according to claim 16 wherein the step of rendering the spectral characteristics of said second image distinguishable comprises converting the reticle image to a colored image at a wave length near the maximum sensitivity of the eye.

20. The method according to claim 18 wherein said step of rendering the spectral characteristics of said second image comprises converting the image to a green image at a wavelength in the range of 540–560 nanometers.

21. The method according to claim 19 wherein said rendering step comprises converting the reticle image to a green image at approximately 546 nanometers.

22. The system as in claim 1, including:
    rotating means for rotating the reticle to determine the minimum and maximum resolution whereby astigmatism may be measured.

23. The system as in claim 22, including:
    a rotatable housing supporting said reticle;
    a lever on said housing whereby the housing and reticle may be rotated sufficiently to determine the maximum and minimum resolution of the lens being tested.

24. System as in claim 7 wherein said color filter is tilted at an angle whereby reflections are eliminated.

25. The system according to claim 24 wherein said color filter is tilted at an angle of less than about 45°.

* * * * *